US012776161B2

(12) United States Patent
Platais et al.

(10) Patent No.: US 12,776,161 B2
(45) Date of Patent: Oct. 27, 2026

(54) SYSTEMS AND METHODS FOR SECURE BIOMETRIC-BASED ELECTRONIC TRANSACTIONS

(71) Applicant: Fidelity Information Services, LLC, Jacksonville, FL (US)

(72) Inventors: John C. Platais, Menomonee Falls, WI (US); Ranadhir Ghosh, St Johns, FL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 362 days.

(21) Appl. No.: 18/463,579

(22) Filed: Sep. 8, 2023

(65) Prior Publication Data

US 2025/0087019 A1 Mar. 13, 2025

(51) Int. Cl.

*G06V 40/16* (2022.01)
*G06F 21/32* (2013.01)
*G06V 10/82* (2022.01)
*G06V 10/98* (2022.01)

(52) U.S. Cl.

CPC ............ *G06V 40/161* (2022.01); *G06F 21/32* (2013.01); *G06V 10/82* (2022.01); *G06V 10/993* (2022.01)

(58) Field of Classification Search

CPC .............................. G06V 40/161; G06F 21/32
See application file for complete search history.

(56) References Cited

U.S. PATENT DOCUMENTS 9,390,327 B2 * 7/2016 Gottemukkula ....... G06V 40/19
11,157,606 B2 * 10/2021 Tussy ...................... G06F 21/32
11,443,551 B2 * 9/2022 Merkel ................. G06F 16/535

OTHER PUBLICATIONS

Ali, et al., "Age-invariant face recognition system using combined shape and texture features", IET, pp. 1-18, 2014 (Year: 2014).*
Sun et al., "Deep Learning Face Representation from Predicting 10,000 Classes", IEEE, pp. 1-8, 2014 (Year: 2014).*
Apampa et al., "Ensuring Privacy of Biometric Factors in Multi-Factor Authentication Systems", DBLP, pp. 1-6, 2008 (Year: 2008).*
Schroff et al., "FaceNet: A Unified Embedding for Face Recognition and Clustering", CV, pp. 1-10, 2015 (Year: 2015).*

(Continued)

*Primary Examiner* — Edward Park
(74) *Attorney, Agent, or Firm* — Bookoff McAndrews, PLLC

(57) ABSTRACT

A computer implemented method for performing a facial biometric authentication is disclosed. The method includes: storing a validation image of a user; receiving a vector representation of a raw image of the user, wherein the raw image was processed and a machine learning model was applied to the processed raw image to determine the vector representation of features of the processed raw image; determining a distance between the vector representation of the raw image and a vector representation of the validation image, wherein the vector representation of the validation image was determined by a same type of machine learning model applied to processed raw images; and outputting an approval or rejection of a biometric authentication based on the determined distance.

17 Claims, 5 Drawing Sheets

(56) References Cited

OTHER PUBLICATIONS

Adler Andy: "Chapter 19: Biometric System Security" from "Handbook of Biometrics", (2008), Springer, XP093224093, pp. 381-402.
Deng Jiankang et al.: "ArcFace: Additive Angular Margin Loss for Deep Face Recognition", (Sep. 4, 2022), pp. 1-17, XP093224102, URL:https://arxiv.org/pdf/1801.07698.
International Search Report of International Application No. PCT/US2024/045612, mailed Nov. 22, 2024, 2 pages.
Inas Al-Taie et al.: "The Effect of Distance Similarity Measures on the Performance of Face, Ear and Palm Biometric Systems", 2017 International Conference On Digital Image Computing: Techniques and Applications (Dicta), IEEE, (Nov. 29, 2017), pp. 1-7, XP033287385, DOI: 10.1109/DICTA.2017.8227495.
Schroff Florian et al.: "FaceNet: A unified embedding for face recognition and clustering", (Jun. 17, 2015), pp. 1-10, XP093224099, U RL:https ://arxiv. org/pdf /1503. 03832.

* cited by examiner

SYSTEMS AND METHODS FOR SECURE BIOMETRIC-BASED ELECTRONIC TRANSACTIONS

TECHNICAL FIELD

The present disclosure relates generally to the field of electronic transaction management, and, more particularly, to systems and methods for secure biometric-based electronic transactions.

BACKGROUND

Demand for multi-factor authentication systems has grown extensively, with biometric authentication being one of the multi-factor authentication methods that has grown in use. Facial biometrics as authentication is a popular form of biometric authentication due to the ease of use. While use of facial biometrics is convenient and flexible, security concerns exist surrounding the processing and storage of individual's facial biometric information. In particular, problems may exist when utilizing a point of sales biometric authentication in contrast to when using a personal device. Storing users' biometric data on a third party device or platform can raise a potential privacy issue.

Thus, a need exists for improving security of electronic transactions utilizing biometric authentication methods that involve storing personal information. More particularly, there is a need to improve security of the storage and transactions of an individual's biometric data.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In some aspects, the techniques describe herein related to a computer implemented method for performing a facial biometric authentication, the method including: storing a validation image of a user; receiving a vector representation of a raw image of the user, wherein the raw image was processed and a machine learning model was applied to the processed raw image to determine the vector representation of features of the processed raw image; determining a distance between the vector representation of the raw image and a vector representation of the validation image, wherein the vector representation of the validation image was determined by a same type of machine learning model applied to processed raw images; and outputting an approval or rejection of a biometric authentication based on the determined distance.

In some aspects, the techniques described herein relate to a method, wherein the raw image was processed by: performing a facial recognition algorithm on the raw image; performing a face cropping algorithm on the raw image; determining that the raw image has an approved designation; and upon performing the facial recognition algorithm and the face cropping algorithm on the raw image, saving the raw image as a first processed raw image.

In some aspects, the techniques described herein relate to a method, wherein the raw image was further processed by: upon determining that the image has an approved designation, performing a gray scale algorithm and/or an image reshaping algorithm on the first processed raw image to generate a second processed raw image; and saving the second processed raw image.

In some aspects, the techniques described herein relate to a method, wherein the raw image was further processed by: performing an invariant transformation on the second processed image; and saving an output of the invariant transformation as the processed raw image.

In some aspects, the techniques described herein relate to a method, wherein the machine learning model that is applied to the processed raw image to determine the vector representation of the features of the processed raw image includes a plurality of machine learning models each configured to generate a respective vector.

In some aspects, the techniques described herein relate to a method, wherein the plurality of machine learning models are convolutional neural networks.

In some aspects, the techniques described herein relate to a method, wherein the received vector representation of the raw image has been encrypted using an encryption algorithm.

In some aspects, the techniques described herein relate to a method, further including decrypting the vector representation of the raw image prior to determining the distance between the vector representation of the raw image and the vector representation of the validation image.

In some aspects, the techniques described herein relate to a method, wherein determining the distance between the vector representation of the raw image and the vector representation of the validation image includes: determining a first distance based on a Manhattan distance algorithm; determining a second distance based on a hamming algorithm; determining a third distance based on a Euclidian distance; and determining a fourth distance based on a Kullback-Leibler divergence algorithm.

In some aspects, the techniques described herein relate to a method, wherein outputting the approval or rejection based on the determined distance includes: determining an approval score based on one or more of: the first distance, the second distance, the third distance, or the fourth distance; and outputting the approval or rejection based on the approval.

In some aspects, the techniques described herein relate to a method, wherein storing the validation image of the user includes storing a plurality of validation images of the user on a server.

In some aspects, the techniques described herein relate to a method, wherein determining the distance between the vector representation of the raw image and the vector representation of the validation image includes: determining a plurality of distances between the vector representation of the raw image and the vector representation of each of the plurality of validation images, the plurality of distances being determined based on one or more of a Manhattan distance algorithm, a hamming algorithm, a Euclidian distance, or a Kullback-Leibler divergence algorithm; identifying which of the vector representations of the plurality of validation images has a closest set of distances to the vector representation of the raw image; and utilizing the identified vector representation to determine an approval score.

In some aspects, the techniques described herein relate to a system for performing a facial biometric authentication, the system including: a memory having processor-readable instructions stored therein; and at least one processor configured to access the memory and execute the processor-readable instructions to perform operations including: storing a validation image of a user; receiving a vector representation of a raw image of the user, wherein the raw image was processed and a machine learning model was applied to the processed raw image to determine the vector representation of features of the processed raw image; determining a distance between the vector representation of the raw image and a vector representation of the validation image, wherein the vector representation of the validation image was determined by a same type of machine learning model applied to processed raw images; and outputting an approval or rejection of a biometric authentication based on the determined distance.

In some aspects, the techniques described herein relate to a system, wherein the raw image was processed by: performing a facial recognition algorithm on the raw image; performing a face cropping algorithm on the raw image; determining that the raw image has an approved designation; and upon performing the facial recognition algorithm and the face cropping algorithm on the raw image, saving the raw image as a first processed raw image.

In some aspects, the techniques described herein relate to a system, wherein the raw image was further processed by: upon determining that the image has an approved designation, performing a gray scale algorithm and/or an image reshaping algorithm on the first processed raw image to generate a second processed raw image; and saving the second processed raw image.

In some aspects, the techniques described herein relate to a system, wherein the raw image was further processed by: performing an invariant transformation on the second processed image; and saving an output of the invariant transformation as the processed raw image.

In some aspects, the techniques described herein relate to a system, wherein the machine learning model that is applied to the processed raw image to determine the vector representation of the features of the processed raw image includes a plurality of machine learning models each configured to generate a respective vector.

In some aspects, the techniques described herein relate to a system, wherein the plurality of machine learning models are convolutional neural networks.

In some aspects, the techniques described herein relate to a system, wherein determining the distance between the vector representation of the raw image and the vector representation of the validation image includes: determining a first distance based on a Manhattan distance algorithm; determining a second distance based on a hamming algorithm; determining a third distance based on a Euclidian distance; and determining a fourth distance based on a Kullback-Leibler divergence algorithm.

In some aspects, the techniques described herein relate to a method for performing a facial biometric authentication, the method including; capturing a raw image of a user; determining, by a preprocessing module, a processed raw image by performing image processing on the raw image; applying, by a machine learning module, a machine learning model to the processed raw image to determine a vector representation of the processed raw image based on features of the processed raw image; transmitting the vector representation of the processed raw image to a server; and receiving from the server, based on the vector representation being compared to a benchmark vector, an approval or rejection of a biometric authentication.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain the principles of the disclosure.

DETAILED DESCRIPTION OF EMBODIMENTS

Figure 1:
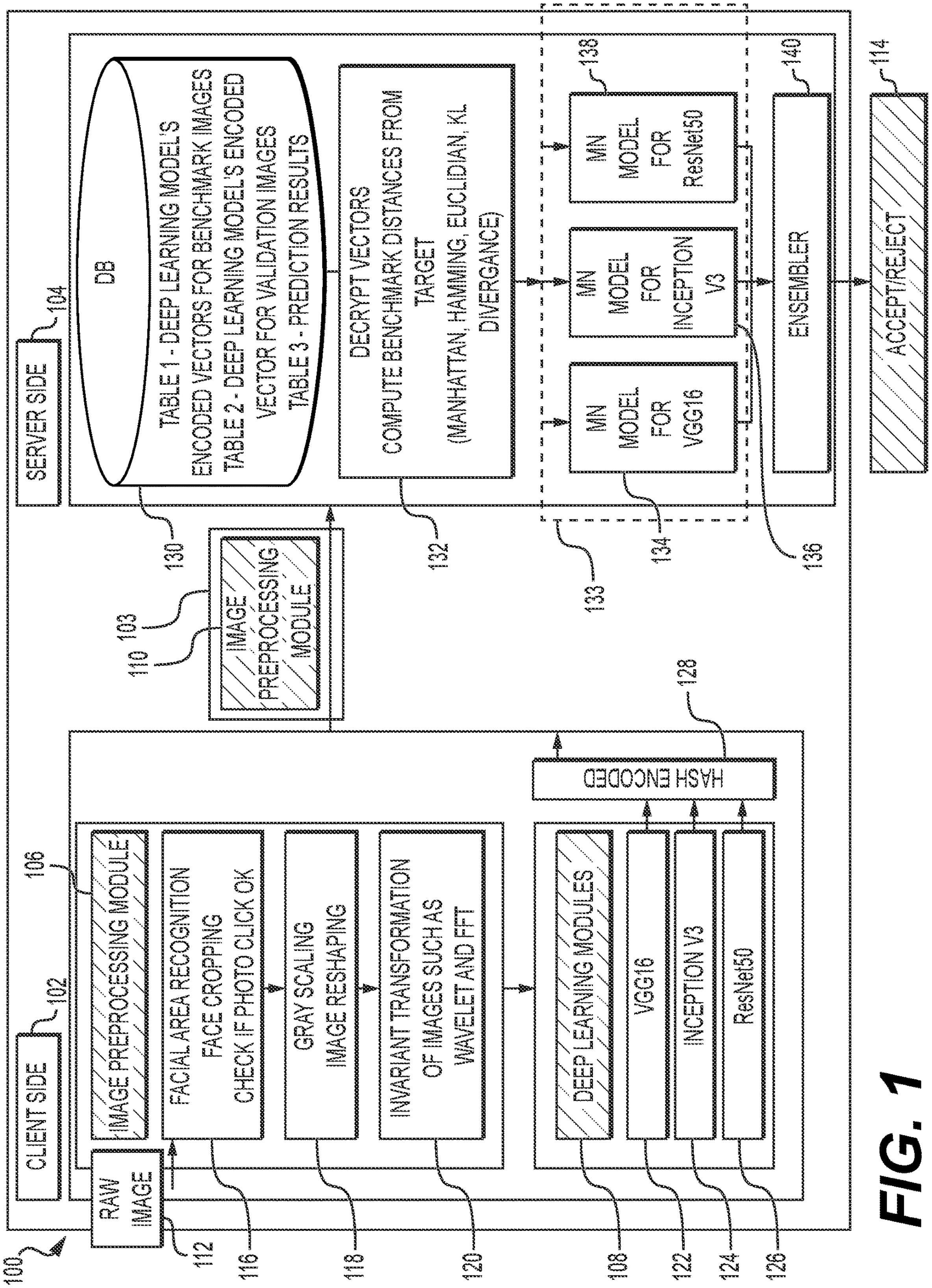
FIG. 1 depicts an exemplary system for biometric-based payments, according to one or more embodiments.

The present disclosure relates generally to the field of electronic transaction management, and, more particularly, to systems and methods for secured biometric based electronic transactions.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As discussed above, the use and demand for biometric authentication for multi-factor authentication has grown in prominence. In particular, facial recognition is one of the more popular forms of biometric authentication due to the ease of use, where a simple scan or photo of a user may be compared to a stored image/profile of the user to provide authentication. Facial biometrics systems may have two major problems. First, the storage and transfer of facial information must be secure before consumers can adopt the technology. Second, when the input of the facial biometric system is a two dimensional image, the image must be processed to overcome invariance problems. Third, a single image may need to be compared to multiple benchmark images (e.g., previously approved images of a user's face) which may have different feature dimensions.

With respect to the first problem, it is important that a biometric authentication system has robust data security. Implementing a facial biometric authentication may include the following. First, a validation model (e.g., a machine learning model) may be stored on a system server, the model being responsible for comparing a received image to a stored benchmark image. Second, a database of the system server may receive and store user images and/or image data. These images or user data may be referred to as benchmark images or data as this may be compared to later uploaded images to provide authentication. Third, the system server may receive images from a user during, for example, a sales process, wherein the received images may be compared against a benchmarked image to perform user validation/authentication.

Storing a user's biometric data on a server may create challenges. For example, storing a user's images for biometric authentication may include saving images of a user on different clouds and servers. Saving these images may raise privacy concerns for individuals. Further, multiple benchmarks may be needed for authentication, leading to further privacy issues, as additional images may need to be saved to a server or cloud.

With respect to the second problem, utilizing machine learning-based validation models may require an algorithm that is standardized in order to adopt various invariance techniques such as rotation, scaling, translation in order to modify an image for standardized authentication. This first level of modification may only partially solve the problem. To address this problem, the systems and methods described herein may further apply various image transformation techniques, such as, e.g., wavelet, or FFT, to achieve a full invariance on the received images.

With respect to the third problem, having multiple benchmark images may create a bigger challenge for 2D image recognition as the output space may not be linearly separable. Positive and negative cases of images overlap across the feature dimension, thus making the recognition problem more difficult for the authentication system. This may be a reason why training on the hashing of image for classification is considered a challenge. In image recognition systems, quite a range of substantial changes both in local and distant neighborhood region maps to the same prediction range, whereas much less absolute value change in the raw image might have a different output target. Hashing may provide a different mapping in such scenarios.

To address the problems above, in one embodiment, the systems and methods described herein may receive and save vectors of the features of an individual, rather than images of the individual for biometric authentication. In one embodiment, the systems and methods described herein may save multiple vectors of features extracted from a set of benchmark images for an individual. The multiple vectors of features may be determined by one or more machine learning systems (e.g., three machine learning systems).

FIG. 1 depicts an exemplary system for biometric-based payments, according to one or more embodiments. The system 100 may include a client side processing device 102 (e.g., one or more client side processing devices) and a system server 104. The client side processing device 102 and system server 104 may communicate for example through a communication network 103. Communication network 103 may support a variety of different communication protocols and communication techniques. The communication network 103 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular communication network and may employ various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof. The network may be a secured network that is private and protected by a firewall and limited external access.

Figure 5:
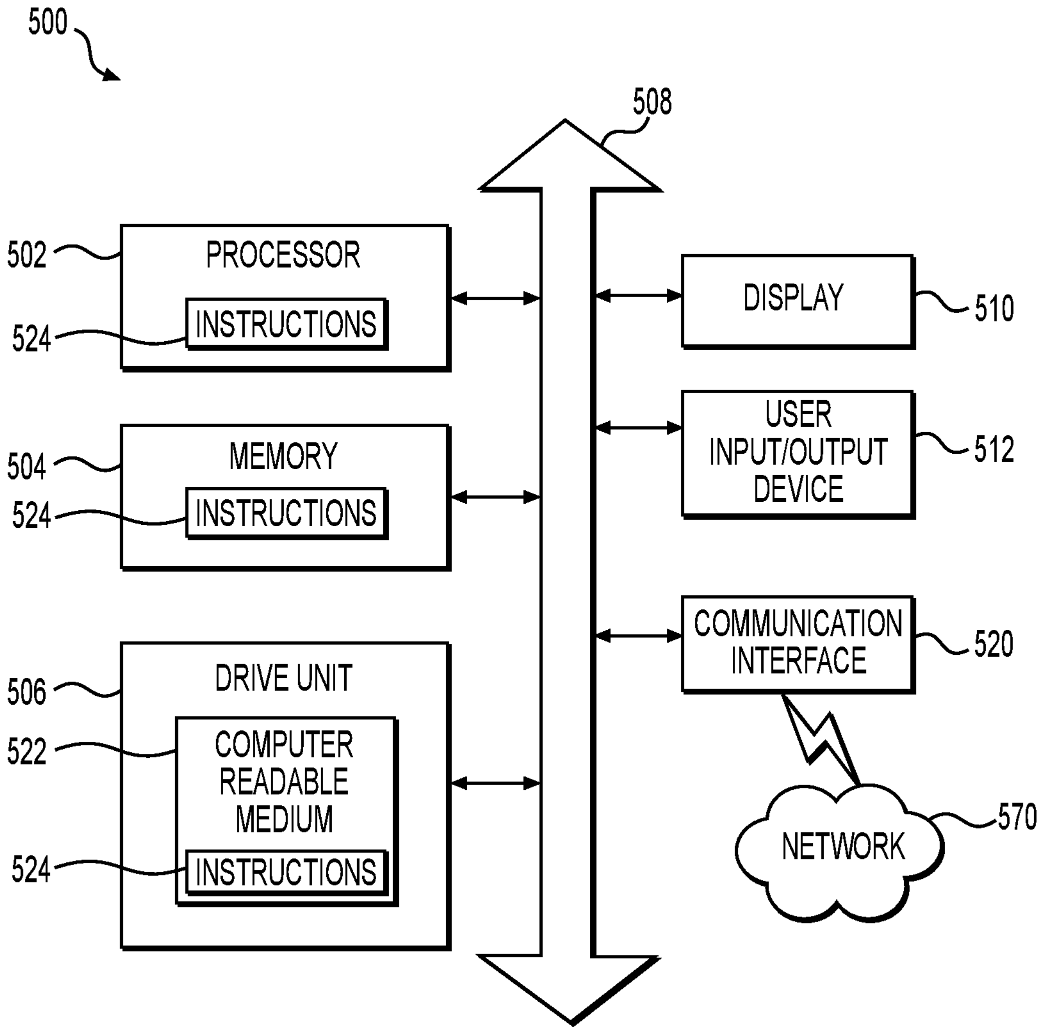
FIG. 5 illustrates a computer system for executing the techniques described herein, according to one or more embodiments of the present disclosure.

The client side processing device 102 may comprise a computer system consistent with or similar to that depicted in FIG. 5. In one embodiment, the client side processing device 102 may be a mobile device comprising a computing system consistent with or similar to that depicted in FIG. 5. The term "mobile device" used herein may refer to a smart phone, a table, a laptop, a smart watch, a wearable device, a gaming device, a handheld computer, a portable media player, or any other mobile or portable computing device. In some embodiments, client side processing device 102 may be configured to receive and/or take a digital image of an individual to authenticate a payment transaction through the system server 104. The client side processing device 102 may also be equipped with various sensors such as, for example, global positioning system (GPS) sensors, vision sensors (i.e., cameras), audio sensors (i.e., microphones), light sensors, temperature sensors, radio frequency sensors, direction sensors (i.e., magnetic compasses, magnetometers, gyroscopes), and acceleration sensors (i.e., accelerometers). The client side processing device may include, or have access to, one or more trained machine learning models as discussed in greater detail below. Further, the client side processing device 102 may be configured to receive digital images from other computing devices such as from the computing system in FIG. 5.

The system server 104 may be a platform with multiple interconnected components. The system server 104 may include one or more servers, intelligent networking devices, computing devices, components, and corresponding software for authenticating a payment by approving a biometric image and determining the biometric image received is of the particular user. This may be performed by, for example, comparing features of the received image to features of benchmark images uploaded by users as will be discussed in greater detail below. In addition, it is noted that system server 104 may be a separate entity of system 100. Further details of the system server 104 are provided below.

In some embodiments, the system server 104 may receive data from the client side processing device 102 through the network 103.

Examining the client side processing device 102, the client side processing device 102 may be capable of taking or receiving a raw image 112, of performing processing on the received or taken image through an image preprocessing module 106, and analyzing the processed image using one or more deep learning modules (e.g., client-side deep learning modules 108). The client side processing device 102 may also include metadata identifying the particular individual. For example a name or identification number, or any other indicator that is representative of the corresponding user, may be included in association with a received raw image 112. In one example, an attempted payment method, such as a credit card number, may be associated and saved with a user's raw image 112.

The client side processing device 102 may receive a digital image (e.g., a raw image 112) through an application programming interface (API) configured to receive an image. The raw image 112 may be referred to as a validation image. The client side processing device 102 may receive image formats including, but not limited to, jpeg, gif, png, tif, psd, pdf, eps, ai, indd, or raw. In another example, the client side processing device 102 may be configured to take an image, e.g., using a camera connected directly or through a network, and save the raw image 112. The raw image 112 may be for example of an individual's face. The raw image 112 may be for example uploaded by either a user or a business attempting to perform a verification. The raw image 112 may then be processed, as described in greater detail below, and sent to a system server 104 to be compared to benchmark images in order to determine whether to authenticate the user.

The client side processing device 102 may further include an image preprocessing modules 106 (e.g., one or more preprocessing modules). For example, the set of image preprocessing modules 106 may include a first module 116 configured to perform an area recognition algorithm, a face cropping algorithm and/or an algorithm configured to confirm that the photograph is approved. The area recognition algorithm may identify and save the pixels of the raw image 112 that correspond to a user's face. The face-cropping algorithm may crop out the pixels of the image not of the user's face. The algorithm configured to confirm that the photograph is approved may verify that an image is of the correct clarity and size to be further processed.

The set of image preprocessing modules 106 may include a second module 118 configured to perform a gray scaling algorithm and an image reshaping algorithm. The second module may receive images pre-processed from the first module 116. The gray scaling algorithm may take the pre-processed images and apply an algorithm to convert the color spaces of the pre-processed image to shades of gray. Image reshaping algorithm may convert the gray-scaled image to a specific dimension and set of pixels. For example, all images may be converted to standardized image size. In one example, the standard size of the processed images may be 224×224 pixels or 299×299 pixels.

The set of image preprocessing modules 106 may include a third module 120 configured to perform an invariant transformation on the processed image. The invariant transformation of the processed image may be for example a wavelet or Fast Fourier Transform (FFT). Exemplary wavelet functions that may be applied include, but are not limited to, Harr, daubechies, biothogonal, coiflets, symlets, morlet, Mexican hat, and meyets. This transformation may convert the processed image file into a final processed version of the received image.

The client side processing device 102 may further include one or more deep learning modules 108. The deep learning modules 108 may include trained machine learning algorithms configured to perform image recognition. Each of the deep learning modules 108 may be configured to receive the processed images from the third module 120. The deep learning modules 108 may comprise components or computing devices of the client side processing device 102. In another example, the deep learning modules 108 may be located on a separate computing device that is accessible by the client side processing device 102. The deep learning modules 108 may be, for example, convolutional neural networks (CNNs). The deep learning modules 108 may be, for example, image recognition machine learning systems. In one example, there may be three deep learning modules. In one example, the deep learning modules may comprise one or more of a VGG16 model 122, an Inception v3 model 124, or a ResNet50 module 126. The deep learning modules 108 may have previously been trained, for example, with substantially the same training data. The deep learning modules 108 may be trained by utilizing supervised deep learning methods, to output vectors for feature comparison of received images.

The VGG16 model 122 may receive as input a 224×224 image. The VGG16 model 122 may for example be a CNN. The VGG16 model 122 may for example include a 16-layer deep neural network with a total of roughly 138 million parameters. The VGG16 model 122 may include an input, convolution layers, a ReLu activation function, hidden layers, pooling layers, and fully connected layers.

The Inception v3 model 124 may receive as input a 299×299 image. The inception v3 model 124 may for example be a CNN. The inception v3 model may for example include a 48-layer deep neural network.

The ResNet50 module 126 may receive as input a 224×224 image. The ResNet50 module 126 may for example be a CNN. The ResNet50 module 126 may for example include a 50-layer deep neural network.

Deep learning modules 108 may receive the processed images from the third module 120, apply the trained machine learning models/algorithms to the processed images, and output a vector. The vectors may define the features of the received image. The outputted vectors from the deep learning modules 108 may then be transferred to a hash encoder 128 within the client side processing device 102.

The hash encoder 128 (the hash coder being configured to perform an encryption and/or hash function) may receive as input vectors from the deep learning modules 108. The hash encoder 128 may be configured to apply a hashing function and/or encryption to the vector to encode the received vectors. The hashing function may for example transform the vector into a fixed length alphanumeric string. The hash encoder 138 may be configured to transfer the hashed data through the network 103 to the system server 104. For example, the hash encoder 128 may include an API configured to transfer the hashed data from the client side processing device 102 to the system server 104. Further, the hashed data may be transferred along with user identifier information to associate the hashed data with a particular user of the system 100. The user identifier information may also be encoded by the hash encoder 128 prior to being transferred to the system server 104.

The system server 104 may for example be connected to network 103 through one or more processing devices or module. The system server 104 may include a database 130, a decryption module 132, one or more deep learning modules 133 (e.g., server-side deep learning modules 133), and an ensembler 140.

The database 130 may utilize a memory for storage of data. The database 130 may include a plurality of tables. In one embodiment, the database 130 may include three tables. The first table may include data of the deep learning modules-encoded vectors for each benchmarked image of a user. The benchmark image may for example, be a digital image (e.g., five digital images) uploaded by a user to the system server 104. The benchmark images may then be transformed to encoded vectors utilizing the deep learning modules 133, as will be further described in FIG. 2. The encoded vectors and their associations with the particular user may be stored in the first table.

The database 130 may further include a second table configured to store the encoded vectors of the received raw image 112 transferred to the system server 104 by the client side processing device 102. The encoded vectors may further be stored with user identifying information that may also be encoded. This may include a name, associated account number, and/or associated payment. Additionally, metadata indicating which machine learning system (e.g., which deep learning module) determined the vector may be stored on the database 130.

The database 130 may further include a third table configured to store prediction results. The prediction results may indicate whether an uploaded raw image 112 is of an approved or not approved indicator. This result may be output from the ensembler 140 as discussed further below. The third table may thus store the results of the system server 104 for approval/rejection of biometric authentication (e.g., to approve financial transactions).

The system server 104 may include a decryption module 132. The decryption module 132 may be configured to receive the encrypted vectors from the first and second tables of the database 130. The decryption module 132 may first perform a decryption algorithm on encoded vectors for benchmark images and encoded vectors for validation images. The decryption module 132 may further, utilizing the user association information, compute the benchmark distances from the decoded vectors of the benchmark images and the decoded vectors for the validation images. In one example, for each user, this computation may be performed by comparing the validation image for a user to all the vectors of benchmark images of the user. The decryption model 132 may compute one or more distances (e.g., four) for each vector-to-vector comparison. The benchmark distances between the vectors may be calculated by applying a Manhattan, hamming, Euclidian, and/or a KL divergence functions. The decryption model 132 may output one or more distances for each benchmark image for each of the machine learning modules applied (e.g., for the VGG16, Inception V3, and ResNet50 machine learning systems). For example, if a user has five benchmark images, a total of twelve distances may be computed for each of the benchmark images for a total of sixty distances. The determined distances may then be saved, for example in the database 130, and transferred to an ensembler 140.

The ensembler 140 may be configured to receive distances between vectors (e.g., between the benchmark and raw/validation images). The ensembler 140 may for example receive distances as a numeral. The ensembler 140 may first compile all distances (e.g., twelve distances) for each benchmark image comparison. The ensember 140 may utilize the distances corresponding to the benchmark image that is the closest match (e.g., the shortest set of distances) to determine an overall authentication score.

If the overall authentication score is within a threshold value, the ensembler 140 may output that a particular received raw image 112 matches the user's benchmark images and output an approval signal. This approval may further be stored in the third table of the database 130. The approval or rejection signal may be transferred, by the network 103 to the client side processing device 102, to approve or reject a potential transaction (e.g., a financial transaction).

The system server 104 may further include deep learning modules 133. The deep learning modules 133 may include trained machine learning algorithms/models configured to perform image recognition. Each of the deep learning modules 133 may be configured to receive the processed images uploaded from a user to serve as a benchmark image. The deep learning modules 133 may include components or computing devices of the system server 104. In another example, the deep learning modules 133 may be located on a separate computing device that is accessible by the system server 104. The deep learning modules 133 may be, for example, convolutional neural networks (CNNs). The deep learning modules 133 may be, for example, image recognition machine learning systems. In one example, there may be three deep learning modules. In one example, the deep learning modules may comprise one or more of a VGG16 model 134, an Inception v3 model 136, or a ResNet50 module 138. The deep learning modules 133 may have previously been trained, for example, with substantially the same training data. The deep learning modules 133 may be trained, by utilizing supervised deep learning methods, to output vectors for feature comparison of received images. The deep learning modules 108 of the client side processing device 102 may be the same as the deep learning modules 133 of the system server 104. The VGG16 model 134 may be trained the same as and have the same features as the VGG16 model 122, the Inception v3 model 136 may be trained the same as and have the same features as the Inception v3 model 124, and the ResNet50 module 138 may be trained the same as and have the same features as the ResNet50 module 126.

Figure 2:
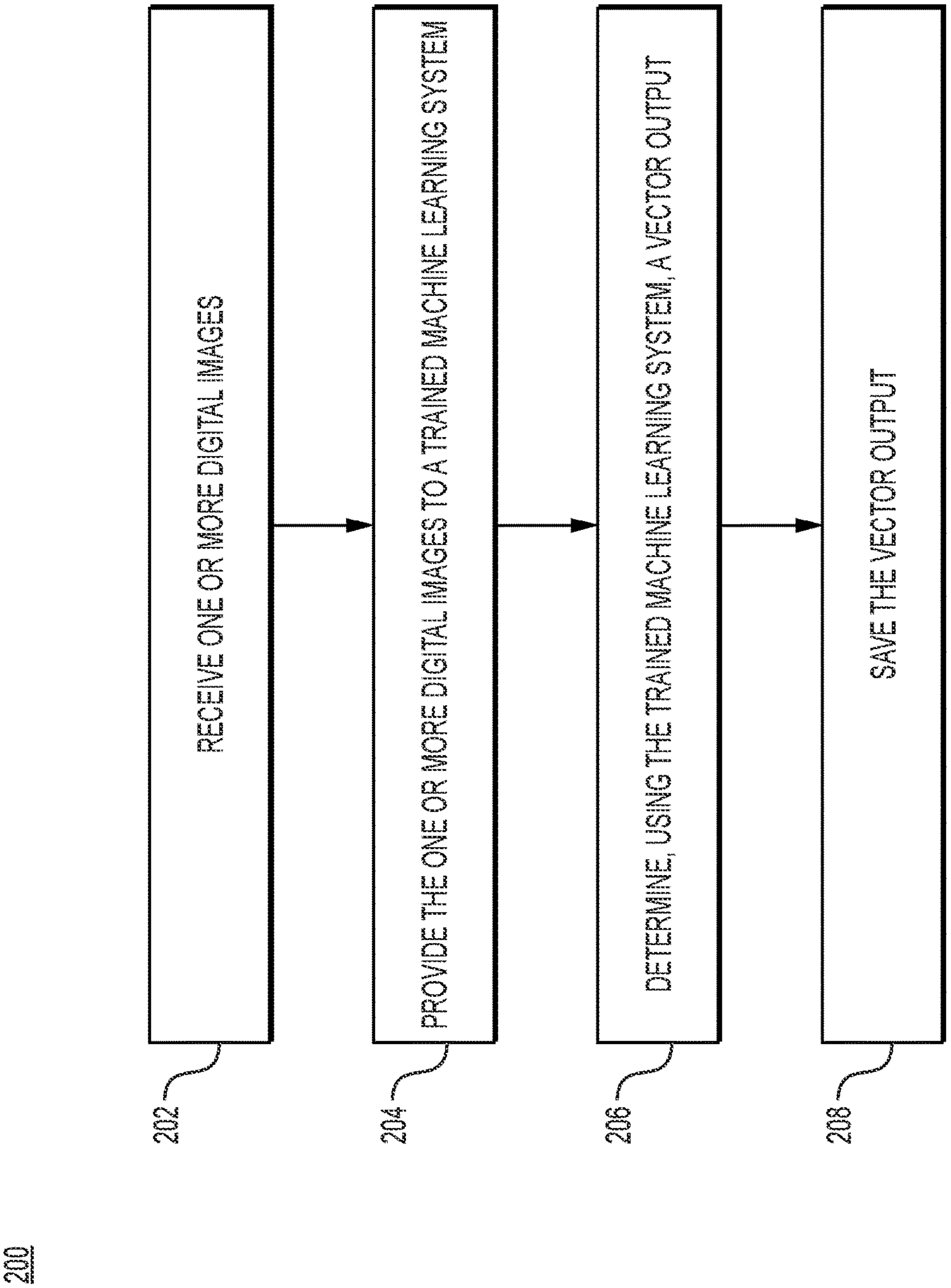
FIG. 2 depicts an exemplary flowchart of biometric information for a user being uploaded to an exemplary server, according to one or more embodiments.

FIG. 2 depicts an exemplary flowchart 200 of biometric information for a user being uploaded to an exemplary server, according to one or more embodiments. The flowchart 200 may depict an exemplary method that a user may perform to upload benchmark images for use of the system 100 described in FIG. 1. Exemplary process flows of the method 200, performed in accordance with the system 100 above, are described hereinafter.

For example, when a user wishes to utilize system 100 for a biometric authentication, a user may first need to upload a benchmark image (e.g., five benchmark images). These benchmark images may be compared to later uploaded use images to determine whether to approve or reject a facial biometric authentication/verification (e.g., for a financial transaction). The benchmark image may be, for example, an image of a user's face.

A user may first take and/or upload one or more raw images (e.g., five raw images) to a computing system consistent with or similar to that depicted in FIG. 5. For example, the device may be a mobile device. The image may then be processed to determine whether the uploaded image is of adequate clarity to be utilized as a benchmark system. For example, the user device may access a system on a network such as the Internet, but may also include other networks such as a corporate WAN, cellular network, satellite network, or combination thereof, for example.

The user device may further include a system that includes or can access via a network, a set of preprocessing modules (e.g., the preprocessing modules 106). The user device may input the received images into the preprocessing modules 106 and have the inputted image have facial recognition, facial cropping, and verification of the image (e.g., using the first module 116). Upon receiving a notification that an image is approved, the image may be sent for further processing. If the verification rejects the image, the user may be prompted for and need to upload an additional image to the system. The newly-received picture may then be analyzed and verified. Upon approving an image verification, an image may further be gray scaled and reshaped (e.g., utilizing the second module 118). Lastly, the image may have an invariant transformation applied (e.g., by the third module 120). In some examples, the image may then be encrypted. The user device may then, through an API, transfer the processed image or encrypted process image to the system server 104 of FIG. 1.

Once the images are received by the system server 104, the client server may first decrypt the processed images if encrypted (e.g., by the decryption module 132). At step 204, the pre-processed images may then be inputted into deep learning modules (e.g., deep learning modules 133). Each received benchmark image may then be input into the deep learning modules 133. For example, each benchmark image may be input into the VGG16 model 134, the Inception v3 model 136, and the ResNet50 module 138.

At step 206, the deep learning modules 133 (e.g., VGG16 model 134, the inception v3 model 136, and the resnet50 module 138) may analyze and output a vector (e.g., one or more vectors). The vector may represent the features extracted from the inputted images and may be utilized for facial biometric authentication at a later time.

At step 208, the vector output may be saved to, for example the first table of database 130. These saved vectors may be used and compared to (e.g., by comparing vector distance through Manhattan, hamming, Euclidian, and KL divergence algorithms) inputted image vectors to determine a facial biometric authentication. These vectors may further be saved with metadata identifying the user that each vector corresponds to along with what benchmark image each vector corresponds to. These vectors may then be retrieved when a user utilizes the validation system (e.g., in method 300) to approve or reject a biometric authentication.

Figure 3:
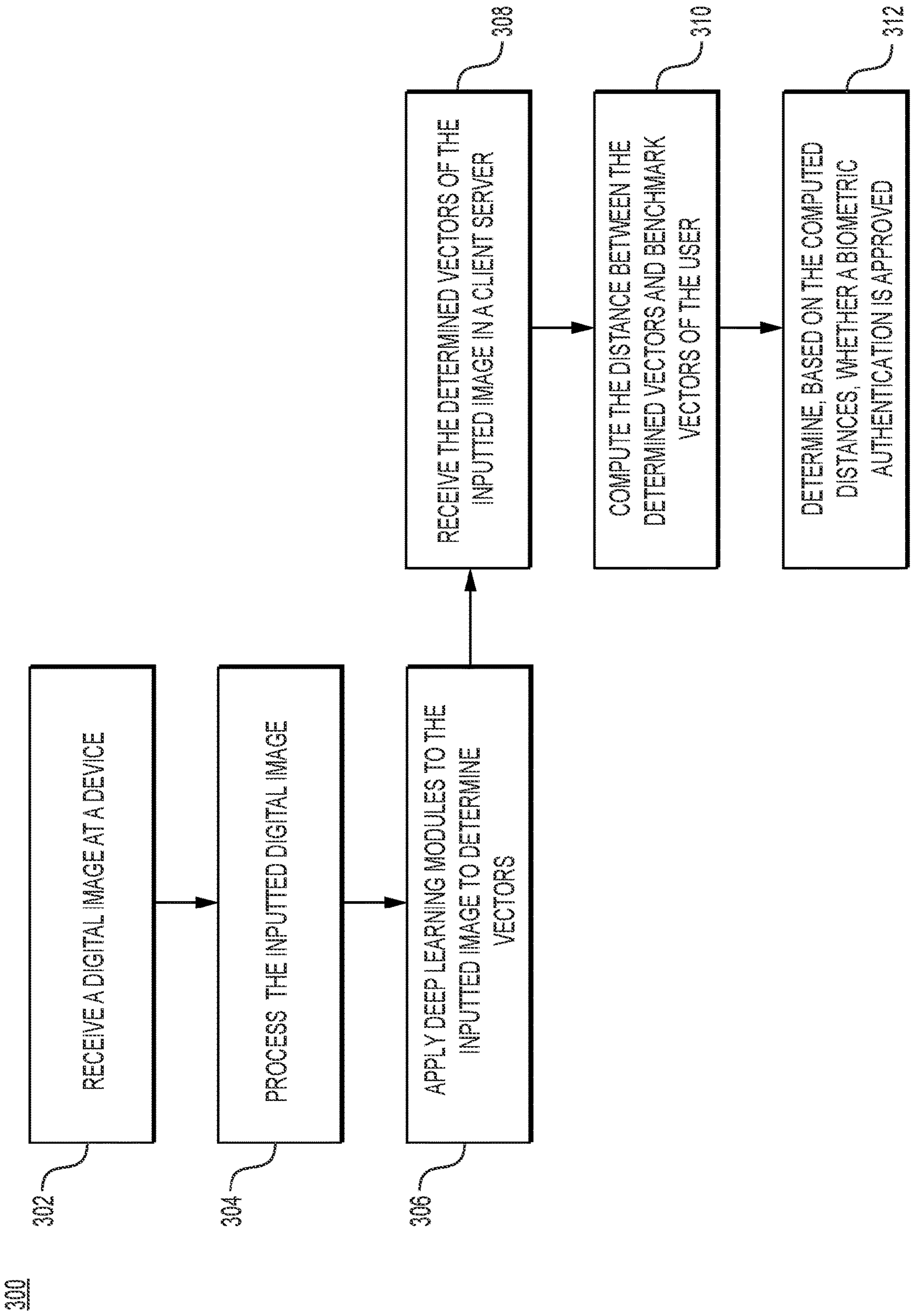
FIG. 3 depicts an exemplary flowchart of how a biometric transaction may be processed by one or more artificial intelligence models to authenticate a user, according to one or more embodiments.

FIG. 3 depicts an exemplary flowchart of how biometric transaction may be processed by one or more artificial intelligence models to authenticate a user, according to one or more embodiments. Exemplary process flows of the method 300, performed in accordance with the system 100 above, are described hereinafter. In one example, steps 302 through 306 may be performed by the client side processing device 102, and steps 308 through 312 may be performed by the system server 104.

At step 302, an API of the client side processing device 102 may receive as input a digital facial image (e.g., raw image 112). For example, a customer may request to perform a payment either online or through an application or through a third-party platform such as a website. In one example, the customer may first use a physical payment card (e.g., a traditional payment card such as a credit card, a debit card, a pre-paid card, a single-use card, etc.) or a virtual payment card (e.g., a digital wallet, etc.). Upon attempting to utilize the physical card or virtual payment, a system (e.g., the client side processing device 102) may require a photograph to authenticate the payment. In another example, a user may attempt to conduct a payment through a facial biometric authentication system. The device (e.g., the client side processing device 102) may then upload the raw image 112. In one example, a third party may take and upload an image of an individual to verify an identity prior to processing a payment.

At step 304, the device (e.g., the client side processing devices 102) may perform processing on the inputted images from step 302. For example, the inputted image may be fed into preprocessing modules 106 of system 100. The processing may standardize the received images from step 302. The processing may first include having a facial area recognition algorithm applied to identify a user's face from a background and from the rest of the user's body. Next, the processing may include a facial cropping of the user's face. The cropped image may then be reviewed by an algorithm (e.g., by the first module 116) to determine an approval or rejection. For example, a score may be assigned and the score may be required to break a threshold value to be approved. This score may be based on the image having a properly identified facial structure with an appropriate clarity. The device may, upon determining that an inputted image is a rejected image, require that a new photograph be uploaded prior to approving a transaction. Upon approval of an updated digital image, the image may be processed further.

Next, a gray scaling algorithm and an image reshaping algorithm may be applied to the approved image. This may be performed by the second module 118. Gray scaling and reshaping the image may standardize the shape of each image while removing color from the images.

Finally, an invariant transformation may be applied to the image (e.g., by the third module 120). For example, a wavelet or FFT transformations may be applied to the images. This may accentuate the features of the inputted image (e.g., by feature extraction). The features may for example be edges or texture of the images. These features may be utilized to distinguish a user in comparison to different individuals.

At step 306, the processed images may be input into deep learning modules (e.g., the deep learning modules 108). Each of the deep learning modules may receive a processed image as input and output a vector for each of the inputted image. For example, a VGG16 model 122, an Inception v3 model 124, and a ResNet50 module may receive the processed image and each output a corresponding vector. The vector may then be utilized by the system 100 to perform a biometric authentication.

The determined vectors may further be encrypted within the client device (e.g., by hash encoder 128) prior to being sent to a server (e.g., system server 104). In one example the received image may be deleted from the device and only encrypted vectors may be sent via a network (e.g., network 103) to a server (e.g., the system server 104).

At step 308, a client server may receive the determined vectors from step 306. The vectors may be received by an API of a client server which then saves the determined vectors to a table in a database (e.g., database 130). The database of the client server may have previously received determined vectors of benchmark images for the user (as described in FIG. 3). These benchmark vectors may be encrypted while being stored in the database. At step 308, the client server may further receive metadata with identifying information for the corresponding received vectors.

Prior to computing the distance between the received vectors and the benchmark vectors, the system, e.g., the decryption module 132 may decrypt the received vectors as well as the saved benchmark vectors.

At step 310, for each received vector, multiple (e.g., four) distances may be determined comparing the distance of the received vector and a benchmark vector of the user. The received vector may be compared to benchmark vector, wherein both vectors were determined utilizing a same type of machine leaning system (e.g., vectors created by VGG16 122 may be compared to vectors created by VGG16 134, vectors created by Inception V3 124 may be compared to vectors created by Inception V3 136, and vectors created by ResNet50 126 may be compared to vectors created by ResNet50 138). During each comparison, four separate distances between the two vectors may be determined. For example, Manhattan, hamming, Euclidian, and/or a KL divergence functions may be utilized to determine four distances for each vector comparison.

For one inputted image, three vectors may be determined by three separate machine learning systems at step 306. These three vectors may then be compared to three corresponding benchmark vectors with four distances being computed for each comparison. Thus, for each benchmark image the server has, twelve distances may be calculated when utilizing three machine learning systems. For example, if there are five total benchmark images uploaded by a user (as explained in FIG. 2), and three vectors created by three separate deep learning modules, then sixty total distances may be calculated at step 310. The grouping of distances of the vectors for each benchmark image may be saved. For example, five sets of twelve distances may be calculated and saved. These distances may be saved in a table of a database (e.g., table 3 of database 130).

At step 312, the system (e.g., the ensembler 140) may receive all of the calculated distances from step 310. Next, the ensembler 140 may utilize the twelve distances determined to be the least overall distance in further calculation. Thus, the benchmark images considered most similar to the inputted image from step 302 may be utilized for the biometric authentication. From here, the ensembler 140 may utilize the functions described in FIG. 1 to determine an overall threshold score. If the overall threshold score is greater than or equal to a threshold value, the system may output a biometric approval. If the threshold score is below a threshold value, the system may output a biometric denial. This approval or denial may for example be saved and/or transferred (e.g., by the network 103) to a third party attempting to validate a user's identity.

Figure 4:
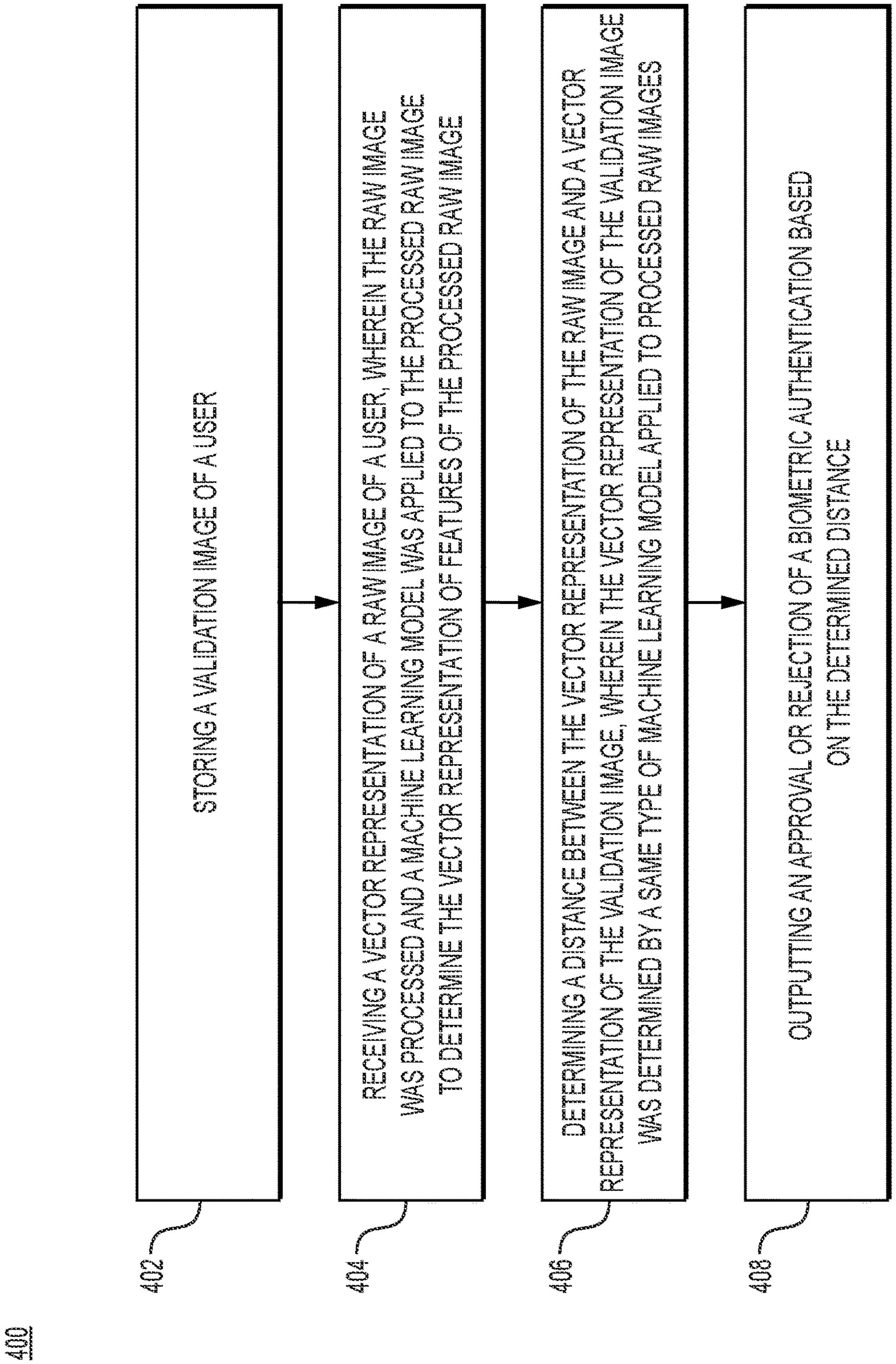
FIG. 4 depicts an exemplary flowchart of a biometric transaction authentication, according to one or more embodiments.

FIG. 4 depicts an exemplary flowchart for performing a facial biometric transaction authentication, according to one or more embodiments.

At step 402, a validation image of a user may be stored. Wherein storing the validation image of the user may include storing a plurality of validation images of the user on a server.

At step 404, a vector representation of a raw image of the user may be received, wherein the raw image was processed and a machine learning model was applied to the processed raw image to determine the vector representation of features of the processed raw image. The raw image may be processed by: performing a facial recognition algorithm on the raw image; performing a face cropping algorithm on the raw image; determining that the raw image has an approved designation; and upon performing the facial recognition algorithm and the face cropping algorithm on the raw image, saving the raw image as a first processed raw image. The raw image may be further preprocessed by, upon determining that the image has an approved designation, performing a gray scale algorithm and/or an image reshaping algorithm on the first processed raw image to generate a second processed raw image; and saving the second processed raw image. The raw image may be further processed by performing an invariant transformation on the second processed image; and saving an output of the invariant transformation as the processed raw image.

The machine learning model that is applied to the processed raw image to determine the vector representation of the features of the processed raw image may include a plurality of machine learning models each configured to generate a respective vector. The plurality of machine learning models may be convolutional neural networks. The received vector representation of the raw image may have been encrypted using an encryption algorithm.

At step 406, a distance between the vector representation of the raw image and a vector representation of the validation image may be determined, wherein the vector representation of the validation image was determined by a same type of machine learning model applied to processed raw images. The vector representation of the raw image may be decrypted prior to determining the distance between the vector representation of the raw image and the vector representation of the validation image. Determining the distance between the vector representation of the raw image and the vector representation of the validation image may include: determining a first distance based on a Manhattan distance algorithm; determining a second distance based on a hamming algorithm; determining a third distance based on a Euclidian distance; and determining a fourth distance based on a Kullback-Leibler divergence algorithm.

Determining the distance between the vector representation of the raw image and the vector representation of the validation image may include: determining a plurality of distances between the vector representation of the raw image and the vector representation of each of the plurality of validation images, the plurality of distances being determined based on one or more of a Manhattan distance algorithm, a hamming algorithm, a Euclidian distance, or a Kullback-Leibler divergence algorithm; identifying which of the vector representations of the plurality of validation images has a closest set of distances to the vector representation of the raw image; and utilizing the identified vector representation to determine an approval score At step 408, an approval or rejection of a biometric authentication based on the determined distance may be output. Outputting the approval or rejection based on the determined distance may include: determining an approval score based on one or more of: the first distance, the second distance, the third distance, or the fourth distance; and outputting the approval or rejection based on the approval.

The systems and methods disclosed herein, may further describe a computer implemented method for performing a facial biometric authentication, the method including: capturing a raw image of a user; determining, by a preprocessing module, a processed raw image by performing image processing on the raw image; applying, by a machine learning module, a machine learning model to the processed raw image to determine a vector representation of the processed raw image based on features of the processed raw image; and transmitting the vector representation of the processed raw image to a server; and receiving from the server, based on the vector representation being compared to a benchmark vector, an approval or rejection of a biometric authentication.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 5 illustrates a computer system designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 500 can be implemented using electronic devices that provide voice, video, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 504 includes a cache or random-access memory for the processor 502. In alternative implementations, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel payment and the like.

As shown, the computer system 500 may further include a display unit 510, such as a liquid crystal display (LCD), an organic light emitting diode (OLED), a flat panel display, a solid-state display, a cathode ray tube (CRT), a projector, a printer or other now known or later developed display device for outputting determined information. The display 510 may act as an interface for the user to see the functioning of the processor 502, or specifically as an interface with the software stored in the memory 504 or in the drive unit 506.

Additionally or alternatively, the computer system 500 may include an input device 512 configured to allow a user to interact with any of the components of system 500. The input device 512 may be a number pad, a keyboard, or a cursor control device, such as a mouse, or a joystick, touch screen display, remote control, or any other device operative to interact with the computer system 500.

The computer system 500 may also or alternatively include a disk or optical drive unit 506. The disk drive unit 506 may include a computer-readable medium 522 in which one or more sets of instructions 524, e.g., software, can be embedded. Further, the instructions 524 may embody one or more of the methods or logic as described herein. The instructions 524 may reside completely or partially within the memory 504 and/or within the processor 502 during execution by the computer system 500. The memory 504 and the processor 502 also may include computer-readable media as discussed above.

In some systems, a computer-readable medium 522 includes instructions 524 or receives and executes instructions 524 responsive to a propagated signal so that a device connected to a network 570 can communicate voice, video, audio, images, or any other data over the network 570. Further, the instructions 524 may be transmitted or received over the network 570 via a communication port or interface 520, and/or using a bus 508. The communication port or interface 520 may be a part of the processor 502 or may be a separate component. The communication port 520 may be created in software or may be a physical connection in hardware. The communication port 520 may be configured to connect with a network 570, external media, the display 510, or any other components in system 500, or combinations thereof. The connection with the network 570 may be a physical connection, such as a wired Ethernet connection or may be established wirelessly as discussed below. Likewise, the additional connections with other components of the system 500 may be physical connections or may be established wirelessly. The network 570 may alternatively be directly connected to the bus 508.

While the computer-readable medium 522 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 522 may be non-transitory, and may be tangible.

The computer-readable medium 522 can include a solid-state memory such as a memory card or other package that houses one or more non-volatile read-only memories. The computer-readable medium 522 can be a random-access memory or other volatile re-writable memory. Additionally or alternatively, the computer-readable medium 522 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 500 may be connected to one or more networks 570. The network 570 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 570 may include wide area networks (WAN), such as the Internet, local area networks (LAN), campus area networks, metropolitan area networks, a direct connection such as through a Universal Serial Bus (USB) port, or any other networks that may allow for data communication. The network 570 may be configured to couple one computing device to another computing device to enable communication of data between the devices. The network 570 may generally be enabled to employ any form of machine-readable media for communicating information from one device to another. The network 570 may include communication methods by which information may travel between computing devices. The network 570 may be divided into sub-networks. The sub-networks may allow access to all of the other components connected thereto or the sub-networks may restrict access between the components. The network 570 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer implemented method for performing a facial biometric authentication, the method comprising:

storing a validation image of a user;

receiving a vector representation of a raw image of the user, wherein the raw image was processed and a machine learning model was applied to the processed raw image to determine the vector representation of features of the processed raw image;

determining a plurality of distances between the vector representation of the raw image and a vector representation of the validation image with a plurality of different algorithms, wherein the vector representation of the validation image was determined by a same type of machine learning model applied to processed raw images, wherein determining the plurality of distances between the vector representation of the raw image and the vector representation of the validation image includes: determining a first distance based on a Manhattan distance algorithm; determining a second distance based on a hamming algorithm; determining a third distance based on a Euclidian distance; and determining a fourth distance based on a Kullback-Leibler divergence algorithm; and outputting an approval or rejection of a biometric authentication based on the determined distances.

2. The method of claim 1, wherein the raw image was processed by:

performing a facial recognition algorithm on the raw image;

performing a face cropping algorithm on the raw image;

determining that the raw image has an approved designation; and upon performing the facial recognition algorithm and the face cropping algorithm on the raw image, saving the raw image as a first processed raw image.

3. The method of claim 2, wherein the raw image was further processed by:

upon determining that the image has an approved designation, performing a gray scale algorithm and/or an image reshaping algorithm on the first processed raw image to generate a second processed raw image; and saving the second processed raw image.

4. The method of claim 3, wherein the raw image was further processed by:

performing an invariant transformation on the second processed image; and saving an output of the invariant transformation as the processed raw image.

5. The method of claim 1, wherein the machine learning model that is applied to the processed raw image to determine the vector representation of the features of the processed raw image includes a plurality of machine learning models each configured to generate a respective vector.

6. The method of claim 5, wherein the plurality of machine learning models are convolutional neural networks.

7. The method of claim 1, wherein the received vector representation of the raw image has been encrypted using an encryption algorithm.

8. The method of claim 7, further comprising decrypting the vector representation of the raw image prior to determining the distances between the vector representation of the raw image and the vector representation of the validation image.

9. The method of claim 1, wherein outputting the approval or rejection based on the determined distances includes:

determining an approval score based on one or more of: the first distance, the second distance, the third distance, or the fourth distance; and outputting the approval or rejection based on the approval.

10. The method of claim 1, wherein storing the validation image of the user includes storing a plurality of validation images of the user on a server.

11. The method of claim 10, wherein determining the plurality of distances between the vector representation of the raw image and the vector representation of the validation image includes:

determining the plurality of distances between the vector representation of the raw image and the vector representation of each of the plurality of validation images, the plurality of distances being determined based on at least two of a Manhattan distance algorithm, a hamming algorithm, a Euclidian distance, or a Kullback-Leibler divergence algorithm;

identifying which of the vector representations of the plurality of validation images has a closest set of distances to the vector representation of the raw image; and utilizing the identified vector representation to determine an approval score.

12. A system for performing a facial biometric authentication, the system comprising:

a memory having processor-readable instructions stored therein; and at least one processor configured to access the memory and execute the processor-readable instructions to perform operations including:

storing a validation image of a user;

receiving a vector representation of a raw image of the user, wherein the raw image was processed and a machine learning model was applied to the processed raw image to determine the vector representation of features of the processed raw image;

determining a plurality of distances between the vector representation of the raw image and a vector representation of the validation image with a plurality of different algorithms, wherein the vector representation of the validation image was determined by a same type of machine learning model applied to processed raw images, wherein determining the plurality of distances between the vector representation of the raw image and the vector representation of the validation image includes: determining a first distance based on a Manhattan distance algorithm; determining a second distance based on a hamming algorithm; determining a third distance based on a Euclidian distance; and determining a fourth distance based on a Kullback-Leibler divergence algorithm; and outputting an approval or rejection of a biometric authentication based on the determined distances.

13. The system of claim 12, wherein the raw image was processed by:

performing a facial recognition algorithm on the raw image;

performing a face cropping algorithm on the raw image;

determining that the raw image has an approved designation; and upon performing the facial recognition algorithm and the face cropping algorithm on the raw image, saving the raw image as a first processed raw image.

14. The system of claim 13, wherein the raw image was further processed by:

upon determining that the image has an approved designation, performing a gray scale algorithm and/or an image reshaping algorithm on the first processed raw image to generate a second processed raw image; and saving the second processed raw image.

15. The system of claim 14, wherein the raw image was further processed by:

performing an invariant transformation on the second processed image; and saving an output of the invariant transformation as the processed raw image.

16. The system of claim 12, wherein the machine learning model that is applied to the processed raw image to determine the vector representation of the features of the processed raw image includes a plurality of machine learning models each configured to generate a respective vector.

17. The system of claim 16, wherein the plurality of machine learning models are convolutional neural networks.

* * * * *